United States Patent
Gotou et al.

(10) Patent No.: US 10,029,726 B2
(45) Date of Patent: Jul. 24, 2018

(54) ELECTRIC POWER STEERING DEVICE

(71) Applicant: KYB Corporation, Tokyo (JP)

(72) Inventors: Hiroyuki Gotou, Gifu (JP); Hisazumi Ishikawa, Gifu (JP); Kazuhiro Sasaki, Gifu (JP); Yuichiro Okamoto, Hessen (DE); Nobuyuki Kimura, Ota (JP); Takayuki Nagase, Ooizumi-machi (JP); Kazuma Yamazaki, Gyoda (JP)

(73) Assignee: KYB Corporation, Tokyo (JP)

( * ) Notice: Subject to any disclaimer, the term of this patent is extended or adjusted under 35 U.S.C. 154(b) by 30 days.

(21) Appl. No.: 15/115,909

(22) PCT Filed: Feb. 4, 2015

(86) PCT No.: PCT/JP2015/053090
§ 371 (c)(1),
(2) Date: Aug. 2, 2016

(87) PCT Pub. No.: WO2015/119149
PCT Pub. Date: Aug. 13, 2015

(65) Prior Publication Data
US 2017/0166246 A1    Jun. 15, 2017

(30) Foreign Application Priority Data

Feb. 4, 2014    (JP) .................................. 2014-019418

(51) Int. Cl.
*B62D 5/04*    (2006.01)
*B62D 6/02*    (2006.01)
*B62D 6/10*    (2006.01)

(52) U.S. Cl.
CPC ......... *B62D 5/0466* (2013.01); *B62D 5/0409* (2013.01); *B62D 6/02* (2013.01); *B62D 6/10* (2013.01)

(58) Field of Classification Search
CPC ...... B62D 5/0466; B62D 5/0409; B62D 6/02; B62D 6/10
See application file for complete search history.

(56) References Cited

U.S. PATENT DOCUMENTS

| 4,735,271 A | * | 4/1988 | Shimizu | ............... | B62D 5/0466 |
| | | | | | 180/446 |
| 6,445,987 B1 | * | 9/2002 | Kurishige | ............ | B62D 5/0466 |
| | | | | | 180/410 |

(Continued)

FOREIGN PATENT DOCUMENTS

| JP | 2007-320383 A | | 12/2007 |
| JP | 2011084120 A | * | 4/2011 |

OTHER PUBLICATIONS

Tetsunori, Machine Translation of JP 2011-084120 A, 2011, JPO (Year: 2011).*

*Primary Examiner* — Frederick M Brushaber
(74) *Attorney, Agent, or Firm* — Hauptman Ham, LLP

(57) ABSTRACT

A electric power steering device includes a basic return command value calculation unit configured to calculate a basic return command value in a direction to return a steering wheel to a neutral position on the basis of a steering angle of the steering wheel, a return command value calculation unit configured to calculate a return command value by correcting the basic return command value by the first correction gain, and an opposite return command value calculation unit configured to calculate an opposite return command value in a direction not to return the steering wheel to the neutral position on the basis of an angular acceleration of an electric motor. A correction return command value is calculated on the basis of the return command value and the opposite return command value and the electric motor is driven by adding the correction return command value to the assist command value.

5 Claims, 7 Drawing Sheets

(56) References Cited

U.S. PATENT DOCUMENTS

2002/0125063 A1* 9/2002 Kurishige ............ B62D 5/0466
                                                                  180/443
2004/0079578 A1* 4/2004 Kurishige ............ B62D 5/0466
                                                                  180/446

* cited by examiner

US 10,029,726 B2

ELECTRIC POWER STEERING DEVICE

TECHNICAL FIELD

The present invention relates to an electric power steering device.

BACKGROUND ART

Some of conventional electric power steering devices execute a steering wheel return control utilizing an electric motor for steering assist.

JP2007-320383A discloses an electric power steering device configured to smoothly return a steering wheel by executing a steering wheel return control so as not to give a sense of incongruity to a driver when two conditions, i.e. a condition that a steering torque is not larger than a small torque threshold value at which a steering wheel hand-off state can be judged and a condition that a torque change rate is not larger than a predetermined torque change rate threshold value are met.

SUMMARY OF INVENTION

If a steering torque is released in a state where a steering wheel is turned during the travel of a vehicle in an electric power steering device in which the steering wheel return control is executed, a returning speed of the steering wheel to a neutral position on a side above a torsion bar is increased by a self-aligning torque trying to return to a straight traveling state and a returning force by the return control. This causes the steering wheel to overtake a wheel side below the torsion bar due to its inertia and the torsion bar is twisted in a direction opposite to the one immediately after the release of the steering torque.

If the torsion bar is twisted in the direction opposite to the one immediately after the release of the steering torque in the process of returning the steering wheel to the neutral position, it is twisted in the further opposite direction, i.e. in the same direction as the one immediately after the release of the steering torque due to its elastic force. As just described, the torsion bar is repeatedly twisted if it is twisted in the direction opposite to the one immediately after the release of the steering torque in the process of returning the steering wheel to the neutral position. If the torsion bar is repeatedly twisted, an assist force output by an electric motor is not stabilized, wherefore the steering wheel does not smoothly return to the neutral position.

The present invention aims to realize a return control capable of smoothly returning a steering wheel to a neutral position.

According to one aspect of the present invention, an electric power steering device for driving an electric motor using an assist command value calculated on the basis of a detection result of a torque sensor for detecting a steering torque input from a steering wheel is provided. The electric power steering device includes: a basic return command value calculation unit configured to calculate a basic return command value in a direction to return the steering wheel to a neutral position on the basis of a steering angle of the steering wheel; a first correction gain calculation unit configured to calculate a first correction gain for correcting the basic return command value on the basis of a vehicle speed of a vehicle mounted with the electric power steering device; a return command value calculation unit configured to calculate a return command value by correcting the basic return command value by the first correction gain; and an opposite return command value calculation unit configured to calculate an opposite return command value in a direction not to return the steering wheel to the neutral position on the basis of an angular acceleration of the electric motor. A correction return command value is calculated on the basis of the return command value and the opposite return command value and the electric motor is driven by adding the correction return command value to the assist command value.

DESCRIPTION OF EMBODIMENT

Hereinafter, an embodiment of the present invention is described with reference to the drawings.

Figure 1:
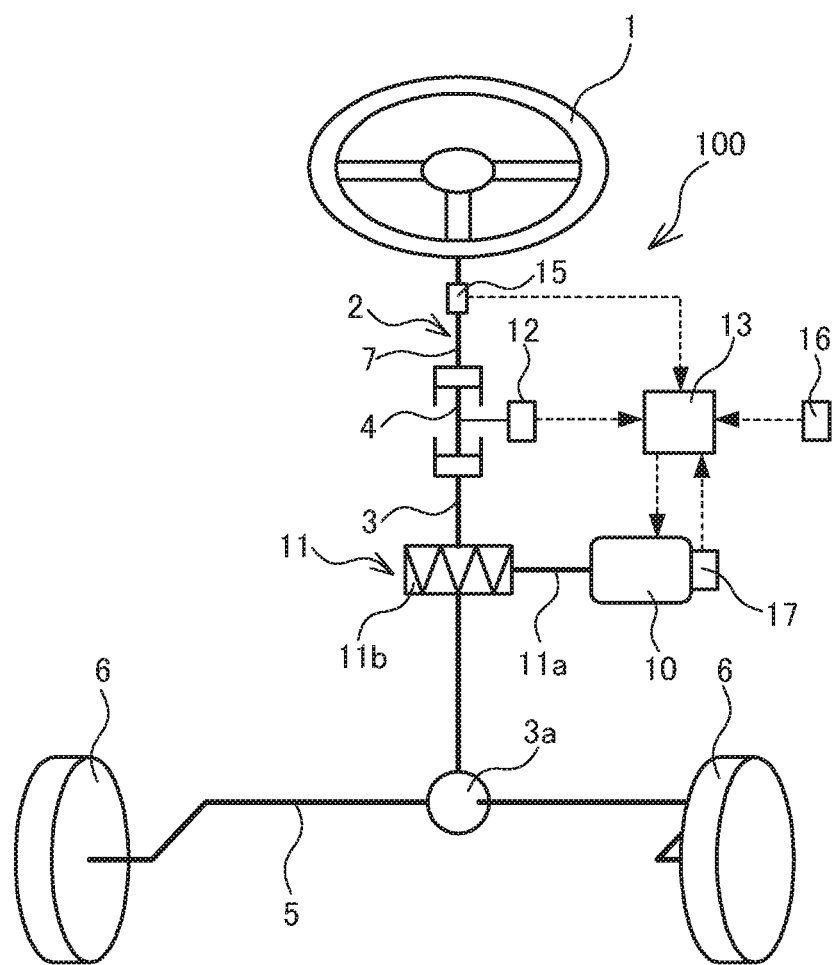
FIG. 1 is a configuration diagram of an electric power steering device according to an embodiment of the present invention.

First, the overall configuration of an electric power steering device 100 according to the embodiment of the present invention is described with reference to FIG. 1.

The electric power steering device 100 includes an input shaft 7 configured to rotate as a steering wheel 1 is operated by a driver, an output shaft 3 having a lower end linked to a rack shaft 5 and a torsion bar 4 coupling the input shaft 7 and the output shaft 3. The electric power steering device 100 turns wheels 6 by moving the rack shaft 5 meshed with a pinion 3a provided on the lower end of the output shaft 3 in an axial direction. A steering shaft 2 is configured by the input shaft 7 and the output shaft 3.

The electric power steering device 100 further includes an electric motor 10 as a drive source for assisting the steering of the steering wheel 1 by the driver, a speed reducer 11 for transmitting the rotation of the electric motor 10 to the steering shaft 2 while decelerating it, a torque sensor 12 for detecting a steering torque input from the steering wheel 1 and a controller 13 for controlling the drive of the electric motor 10 on the basis of a detection result of the torque sensor 12.

The electric motor 10 is provided with an angle detector 17 for detecting a rotational angle of the motor. A detection result of the angle detector 17 is output to the controller 13.

The speed reducer 11 is composed of a worm shaft 11a coupled to an output shaft of the electric motor 10 and a worm wheel 11b coupled to the output shaft 3 and meshed with the worm shaft 11a. A torque output by the electric motor 10 is transmitted to the worm wheel 11b from the worm shaft 11a and applied as an assist torque to the output shaft 3.

The torque sensor 12 detects the steering torque applied to the torsion bar 4 on the basis of the relative rotation of the input shaft 7 and the output shaft 3. The torque sensor 12 outputs a voltage signal corresponding to the detected steering torque to the controller 13. The controller 13 calculates the torque output by the electric motor 10 on the basis of the voltage signal from the torque sensor 12 and controls the drive of the electric motor 10 to generate the calculated torque. In this way, the electric power steering device 100 drives the electric motor 10 on the basis of the detection result of the torque sensor 12 for detecting the steering torque input from the steering wheel 1 and assists the steering of the steering wheel 1 by the driver.

The steering shaft 2 is provided with a steering angle sensor 15 serving as a steering angle detector for detecting a steering angle (absolute steering angle) of the steering wheel 1. A detection result of the steering angle sensor 15 is output to the controller 13. The steering angle sensor 15 outputs 0° as a steering angle if the steering wheel 1 is at a neutral position. Further, a steering angle with a (+) sign is output according to the rotation of the steering wheel 1 if the steering wheel 1 is turned rightward from the neutral position, whereas a steering angle with a (−) sign is output according to the rotation of the steering wheel 1 if the steering wheel 1 is turned leftward from the neutral position.

A detection result of a vehicle speed sensor 16 serving as a vehicle speed detector for detecting a vehicle speed is input to the controller 13.

The controller 13 includes a CPU for controlling the operation of the electric motor 10, a ROM storing control programs, set values and the like necessary for the processing operation of the CPU and a RAM for temporarily storing information detected by various sensors such as the torque sensor 12, the angle detector 17, the steering angle sensor 15 and the vehicle speed sensor 16.

During the travel of the vehicle, a self-aligning torque trying to return to a straight traveling state acts on the wheels 6. This self-aligning torque is small during low-speed travel although it is large during high-speed travel. In a low-speed region where the self-aligning torque is small, the returnability of the steering wheel 1 to the neutral position is deteriorated due to the friction of gears of a steering system such as the worm shaft 11a and the worm wheel 11b. Thus, during low-speed travel, the steering wheel 1 may not completely return to the neutral position even if the steering wheel 1 is released from a turned state. Accordingly, a return control for improving the returnability of the steering wheel 1 to the neutral position even in the low-speed region is executed in the electric power steering device 100.

Next, a control of the electric motor 10 by the controller 13 is described with reference to FIGS. 2 to 6.

Figure 2:
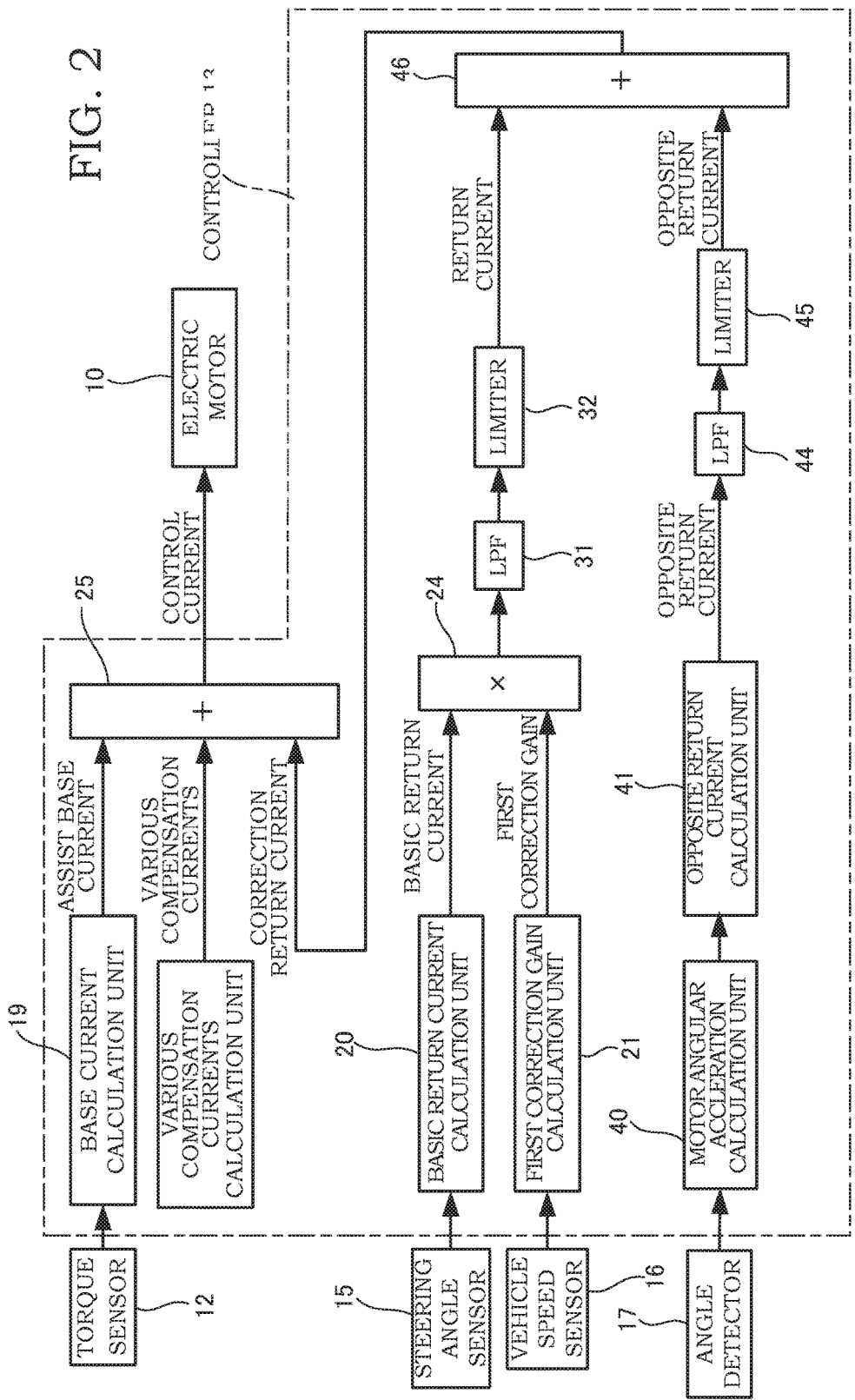
FIG. 2 is a control block diagram of the electric power steering device according to the embodiment of the present invention.

As shown in FIG. 2, the controller 13 includes a base current calculation unit 19 for calculating an assist base current (assist command value) for assisting the steering of the steering wheel 1 by the driver on the basis of the detection result of the torque sensor 12.

The controller 13 further includes a basic return current calculation unit (basic return command value calculation unit) 20 for calculating a basic return current (basic return command value) in a direction to return the steering wheel 1 to the neutral position, a first correction gain calculation unit 21 for calculating a first correction gain for correcting the basic return current and a multiplier 24 serving as a return command value calculation unit for calculating a return current (return command value) by multiplying the basic return current and the first correction gain.

The controller 13 further includes a motor angular acceleration calculation unit 40 for calculating an angular acceleration of the electric motor 10 from the rotational angle detected by the angle detector 17 and an opposite return current calculation unit (opposite return command value calculation unit) 41 for calculating an opposite return current in a direction not to return the steering wheel 1 to the neutral position.

The controller 13 further includes an adder 46 for calculating a correction return current (correction return command value) by adding the return current calculated by the multiplier 24 and the opposite return current calculated by the opposite return current calculation unit 41. The correction return current is added to the assist base current by an adder 25.

In the adder 25, various compensation currents for compensating for the friction of the gears and the like are also added besides the assist base current and the correction return current and the resulting current is output as a control current for controlling the drive of the electric motor 10 to the electric motor 10.

As described above, the electric motor 10 is controlled by the control current obtained by adding the correction return current obtained by adding the return current in the direction to return the steering wheel 1 to the neutral position and the opposite return current in the direction not to return the steering wheel 1 to the neutral position to the assist base current for assisting the steering of the steering wheel 1 by the driver.

The return control is described below.

First, a return current calculation method is described in detail with reference to FIGS. 2 to 4.

The basic return current calculation unit 20 calculates the basic return current in the direction to return the steering wheel 1 to the neutral position on the basis of the detection result of the steering angle sensor 15. Specifically, the basic return current corresponding to the steering angle input from the steering angle sensor 15 is calculated by referring to a basic return current calculation map shown in FIG. 3. The basic return current is a basic current of the return control.

Figure 3:
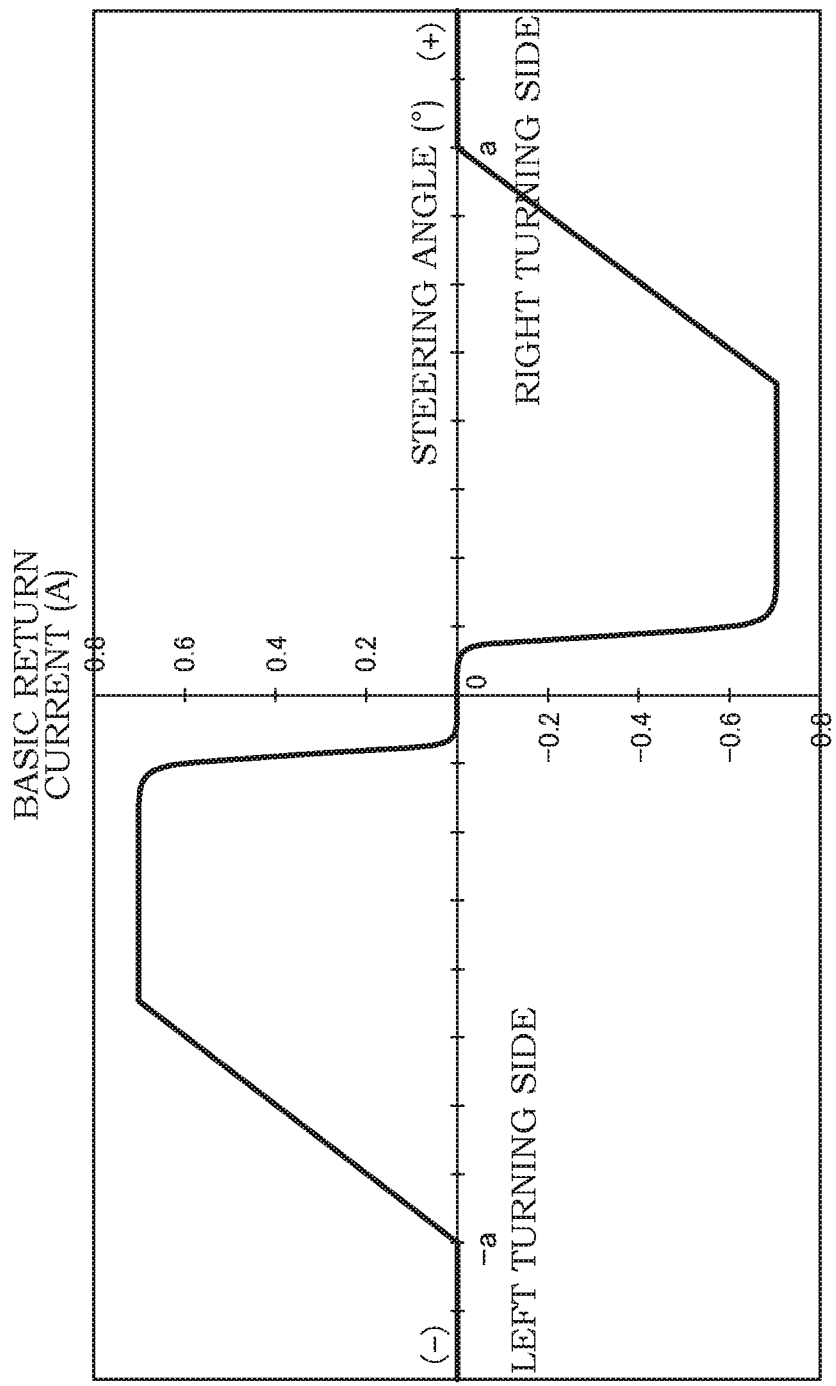
FIG. 3 is a basic return current calculation map chart for calculating a basic return current.

The basic return current calculation map shown in FIG. 3 is a map specifying a relationship of the steering angle and the basic return current, wherein a horizontal axis represents the steering angle and a vertical axis represents the basic return current. A (+) side of the horizontal axis indicates the steering angle on a right turning side from the neutral position and a (−) side indicates the steering angle on a left turning side from the neutral position. Further, a (+) side of the vertical axis indicates the basic return current for assisting the rightward rotation of the steering wheel 1 and a (−) side indicates the basic return current for assisting the leftward rotation of the steering wheel 1. As understood from FIG. 3, in a characteristic of the basic return current calculation map, the basic return current has a value for assisting the leftward rotation of the steering wheel 1 when the steering angle is on the rightward turning side and has a value for assisting the rightward rotation of the steering wheel 1 when the steering angle is on the leftward turning side. As just described, the basic return current is a current in the direction to return the steering wheel 1 to the neutral position.

The basic return current calculation map shown in FIG. 3 is described in detail. The basic return current is set in a dead zone to be zero near the neutral position of the steering wheel 1. This is to prevent the occurrence of a disturbance due to a detection error of the steering angle sensor 15. If an absolute value of the steering angle increases to be larger than the dead zone, an absolute value of the basic return current increases with a predetermined gradient. By adjusting this gradient, a return feeling sensed by the driver when the steering wheel 1 returns to the neutral position can be changed. The larger the set gradient, the larger the return feeling. The basic return current is set at zero in a range where the absolute value of the steering angle is equal to or more than a predetermined value of a°. This is because the basic return current acts only near the neutral position and is prevented from acting when the steering wheel 1 is largely turned since the basic return current acts to increase a steering force by the driver when the steering wheel 1 is turned. This is also to suppress a sudden return in returning the largely turned steering wheel 1.

The first correction gain calculation unit 21 calculates the first correction gain for correcting the basic return current on the basis of the detection result of the vehicle speed sensor 16. Specifically, the first correction gain corresponding to the vehicle speed input from the vehicle speed sensor 16 is calculated by referring to a first correction map shown in FIG. 4. Since the self-aligning torque changes according to the vehicle speed, the basic return current is corrected by the first correction gain that changes according to the vehicle speed.

Figure 4:
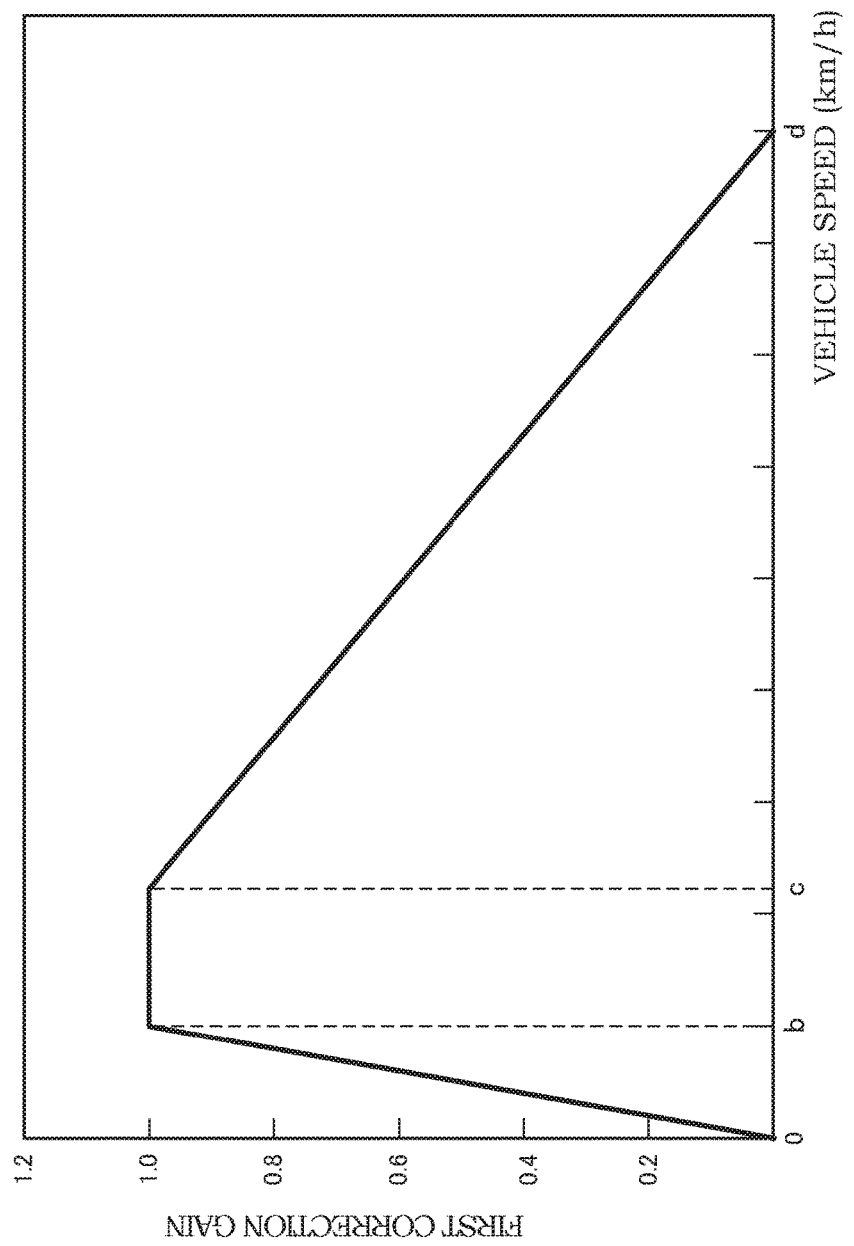
FIG. 4 is a first correction map chart for calculating a first correction gain.

The first correction map shown in FIG. 4 is a map specifying a relationship of the vehicle speed and the first correction gain, wherein a horizontal axis represents the vehicle speed and a vertical axis represents the first correction gain. The first correction gain is set to be equal to or less than 1.0 in the entire vehicle speed region. That is, the first correction gain is a value for reducing the basic return current. Since the self-aligning torque is large during high-speed travel and small during low-speed travel, the first correction gain is set at 1.0 in a low-speed region where the vehicle speed is b to c km/h, set at a smaller value as the vehicle speed increases in a medium/high-speed region where the vehicle speed is equal to or more than c km/h and set at zero at a predetermined speed of d km/h or higher as shown in FIG. 4. Further, in a very low-speed region where the vehicle speed is equal to or less than b km/h, the first correction gain is set at a smaller value as the vehicle speed decreases. The first correction gain is set to decrease with a predetermined gradient in this way to reduce a sense of incongruity in steering caused when the vehicle is stopped and the first correction gain becomes zero.

The basic return current calculated by the basic return current calculation unit 20 and the first correction gain calculated by the first correction gain calculation unit 21 are processed by a low-pass filter 31 and an upper/lower limit value limiter 32 and output as the return current to the adder 46 after being multiplied by the multiplier 24.

As described above, the return current obtained by correcting the basic return current in the direction to return the steering wheel 1 to the neutral position by the first correction gain is set at a large value in the low-speed region and set at a smaller value as the vehicle speed increases in the medium/high-speed region.

Next, an opposite return current calculation method is described in detail with reference to FIGS. 2 and 5.

The opposite return current calculation unit 41 calculates the opposite return current in the direction not to return the steering wheel 1 to the neutral position on the basis of the motor angular acceleration calculated by the motor angular acceleration calculation unit 40. Specifically, the opposite return current corresponding to the motor angular acceleration input from the motor angular acceleration calculation unit 40 is calculated by referring to an opposite return current calculation map shown in FIG. 5.

Figure 5:
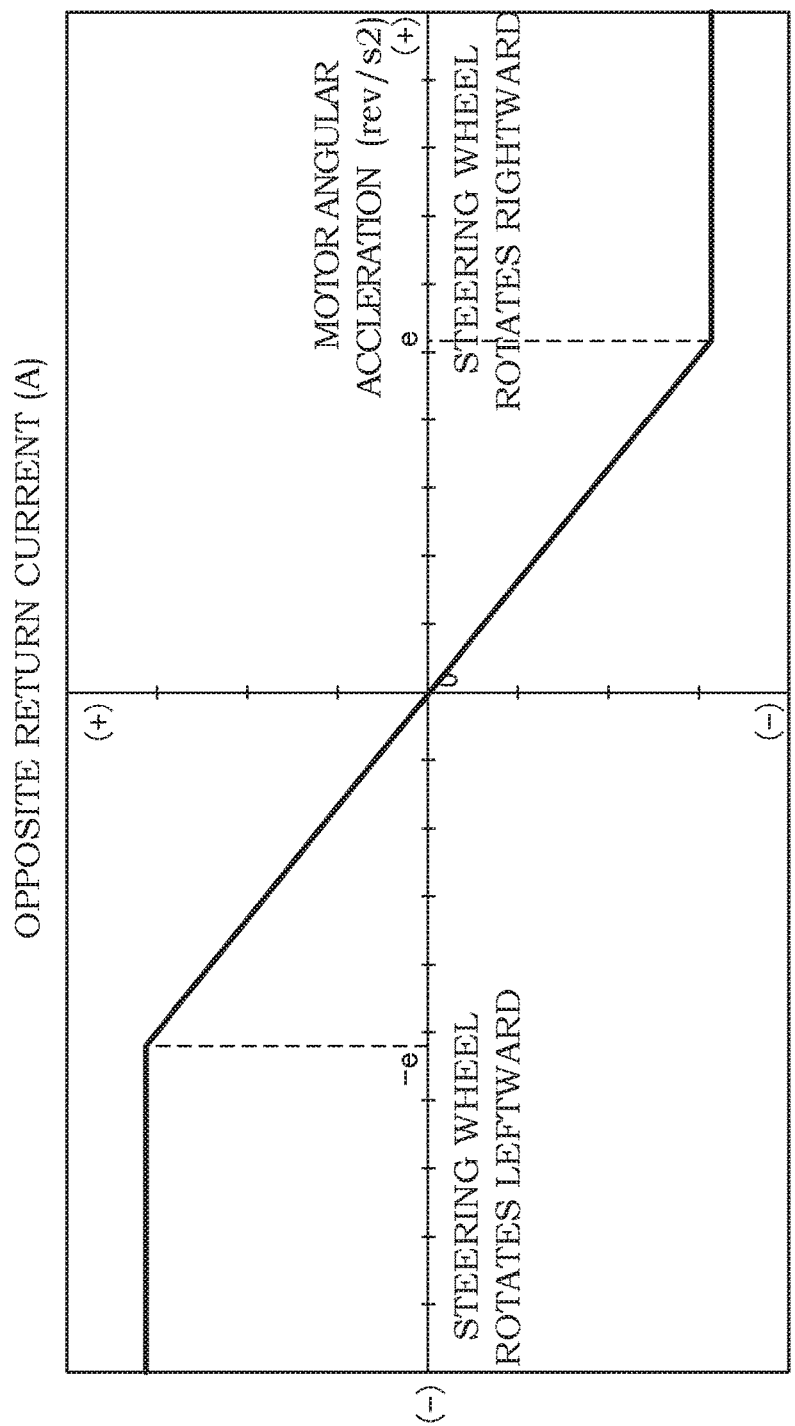
FIG. 5 is an opposite return current calculation map chart for calculating an opposite return current.

The opposite return current calculation map shown in FIG. 5 is a map specifying a relationship of the angular acceleration of the electric motor 10 and the opposite return current, wherein a horizontal axis represents the angular acceleration of the electric motor 10 and a vertical axis represents the opposite return current. A (+) side of the horizontal axis indicates the angular acceleration of the electric motor 10 when the steering wheel 1 rotates rightward (clockwise) and a (−) side indicates the angular acceleration of the electric motor 10 when the steering wheel 1 rotates leftward (counterclockwise). Further, a (+) side of the vertical axis indicates the opposite return current in a direction to rotate the steering wheel 1 rightward and a (−) side indicates the opposite return current in a direction to rotate the steering wheel 1 leftward. As understood from FIG. 5, in a characteristic of the opposite return current calculation map, the opposite return current has a value for rotating the steering wheel 1 leftward when the steering wheel 1 rotates rightward and has a value for rotating the steering wheel 1 rightward when the steering wheel 1 rotates leftward. As just described, the opposite return current is a current in the direction not to return the steering wheel 1 to the neutral position.

The opposite return current calculation map shown in FIG. 5 is described in detail. An absolute value of the opposite return current increases with a predetermined gradient as an absolute value of the angular acceleration of the electric motor 10 increases. That is, as the absolute value of the angular acceleration of the electric motor 10 increases, the absolute value of the opposite return current is set to become larger. However, the opposite return current is set at a fixed value if the absolute value of the angular acceleration of the electric motor 10 is a predetermined value of e rev/s$^2$ or higher. This is because the return control is not stable if the value of the opposite return current becomes excessively large. It should be noted that a dead zone may be set in a region where the sign of the angular acceleration of the electric motor 10 changes. By setting the dead zone, the occurrence of a disturbance due to an error of the angular acceleration of the electric motor 10 can be prevented.

When the opposite return current is calculated by referring to the opposite return current calculation map in the opposite return current calculation unit 41, it is desirable to use a moving average value of the motor angular acceleration. By using the moving average value, the value of the motor angular acceleration input to the opposite return current calculation unit 41 becomes a smooth value, wherefore a more stable control is realized.

The opposite return current calculated by the opposite return current calculation unit 41 is processed by a low-pass filter 44 and an upper/lower limit value limiter 45 and output to the adder 46. In the adder 46, the return current output from the multiplier 24 and the opposite return current output from the opposite return current calculation unit 41 are added to calculate the correction return current. The correction return current output from the adder 46 is added to the assist base current by the adder 25.

Functions and effects of this embodiment are described below.

During low-speed travel, the steering wheel 1 may not completely return to the neutral position even if it is released from the turned state. Accordingly, the return current is added to the assist base current. The return current is set at a large value in the low-speed region by a characteristic of the first correction gain for correcting the basic return current. Thus, the returnability of the steering wheel 1 to the neutral position during low-speed travel is improved.

However, as a result of setting the return current during low-speed travel at a large value, both the self-aligning torque trying to return to the straight traveling state and a motor assist torque by the return control work in a superimposed manner on the side of the output shaft 3 below the torsion bar 4 (side of the wheels 6) immediately after the release of the steering torque if the steering wheel 1 is released from the turned state during low-speed travel. On the other hand, since friction and steering wheel inertia from the steering wheel 1 to the input shaft 7 work on the side of the input shaft 7 above the torsion bar 4 (side of the steering wheel 1), the return to the neutral position may be started with a delay from the side below the torsion bar 4. However, after the start of the delayed return, a returning speed of the side above the torsion bar 4 to the neutral position is accelerated due to the inertia of the steering wheel 1 and the side above the torsion bar 4 overtakes the side below the torsion bar 4. If the side of the steering wheel 1 overtakes the side of the wheels 6, the torsion bar 4 is twisted in a direction opposite to the one immediately after the release of the steering torque and the assist base current in the direction to return the steering wheel 1 to the neutral position is calculated by the base current calculation unit 19. In this way, the return current and the assist base current are superimposed to strengthen the motor assist torque and the returning speed of the steering wheel 1 to the neutral position is further accelerated.

If the torsion bar 4 is twisted to a certain extent or more, it is twisted in an opposite direction, i.e. in the same direction as the one immediately after the release of the steering torque due to its elastic force, and the assist base current in the direction not to return the steering wheel 1 to the neutral position is calculated by the base current calculation unit 19. Since the return current is reduced in this way, the motor assist torque is weakened and the returning speed of the steering wheel 1 to the neutral position is decelerated. As just described, if a returning force by the return control is strong when the steering wheel 1 is released from the turned state, an inertial force of the steering wheel 1 increases, wherefore the twisting of the torsion bar 4 is promoted and the torsion bar 4 is repeatedly twisted in the opposite direction and in the forward direction. Further, since the assist base current is calculated in the direction to promote the twisting of the torsion bar 4 due to the twisting of the torsion bar 4, the returning speed of the steering wheel 1 is increased and decreased and the steering wheel 1 does not smoothly return to the neutral position.

However, in the present embodiment, the correction return current corrected by the opposite return current in the direction not to return the steering wheel 1 to the neutral position calculated on the basis of the motor angular acceleration is used as the return current. The opposite return current is set to increase the absolute value thereof as the absolute value of the angular acceleration of the electric motor 10 increases. That is, the opposite return current corrects the return current to suppress the angular acceleration of the electric motor 10.

Thus, when the angular acceleration of the electric motor 10 increases immediately after the release of the steering wheel 1 from the turned state during low-speed travel, the electric motor 10 is controlled to suppress a change of the motor angular acceleration. Since this prevents the side of the steering wheel 1 that starts returning to the neutral position with a delay from overtaking the side of the wheels 6, the torsion bar 4 is prevented from being repeatedly twisted. Thus, the control current output to the electric motor 10 is stabilized and the steering wheel 1 smoothly returns to the neutral position.

A modification of the above embodiment is described below.

Figure 6:
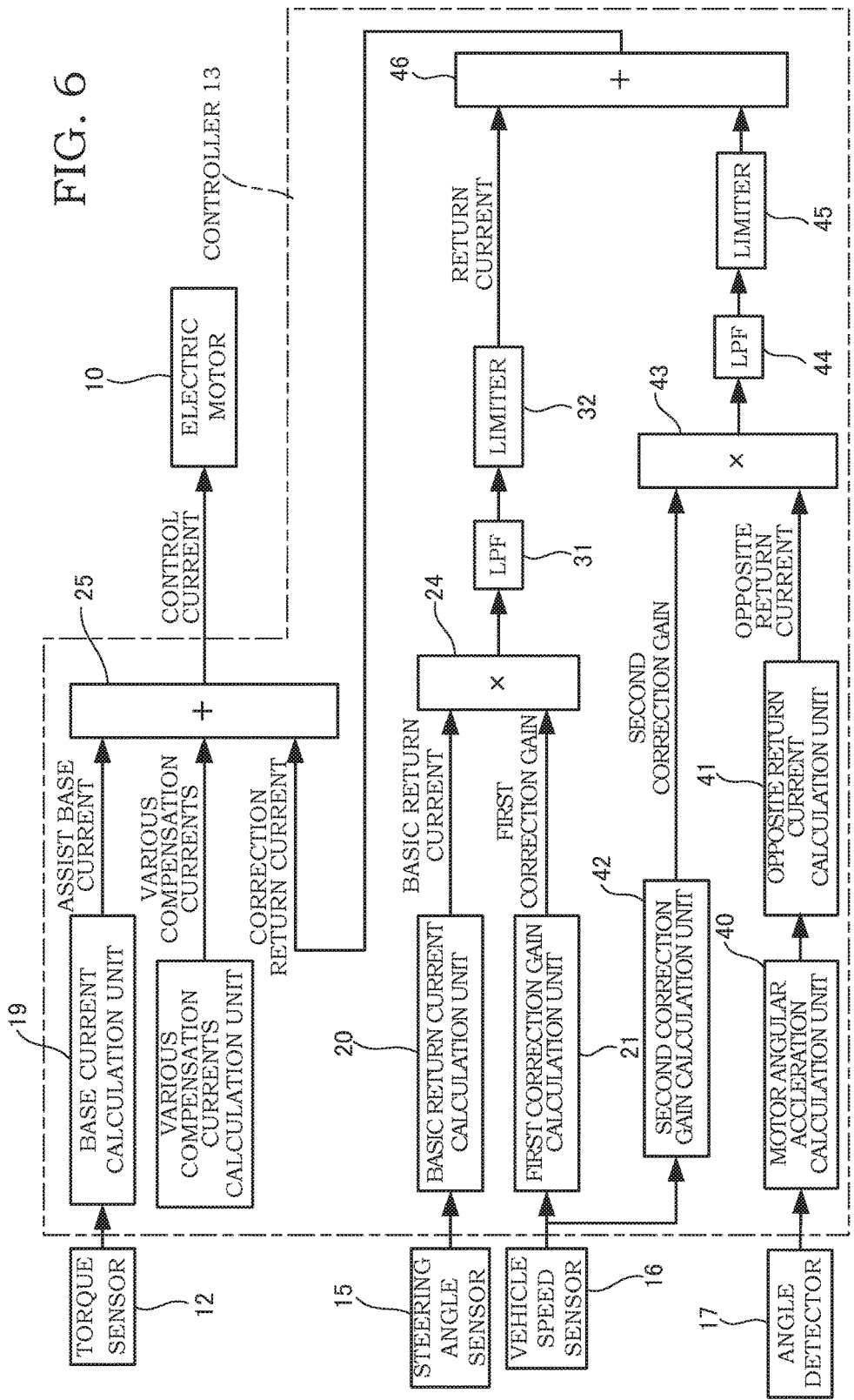
FIG. 6 is a control block diagram of an electric power steering device according to a modification of the embodiment of the present invention.

As shown in FIG. 6, the controller 13 may include a second correction gain calculation unit 42 for calculating a second correction gain for correcting the opposite return current.

Figure 7:
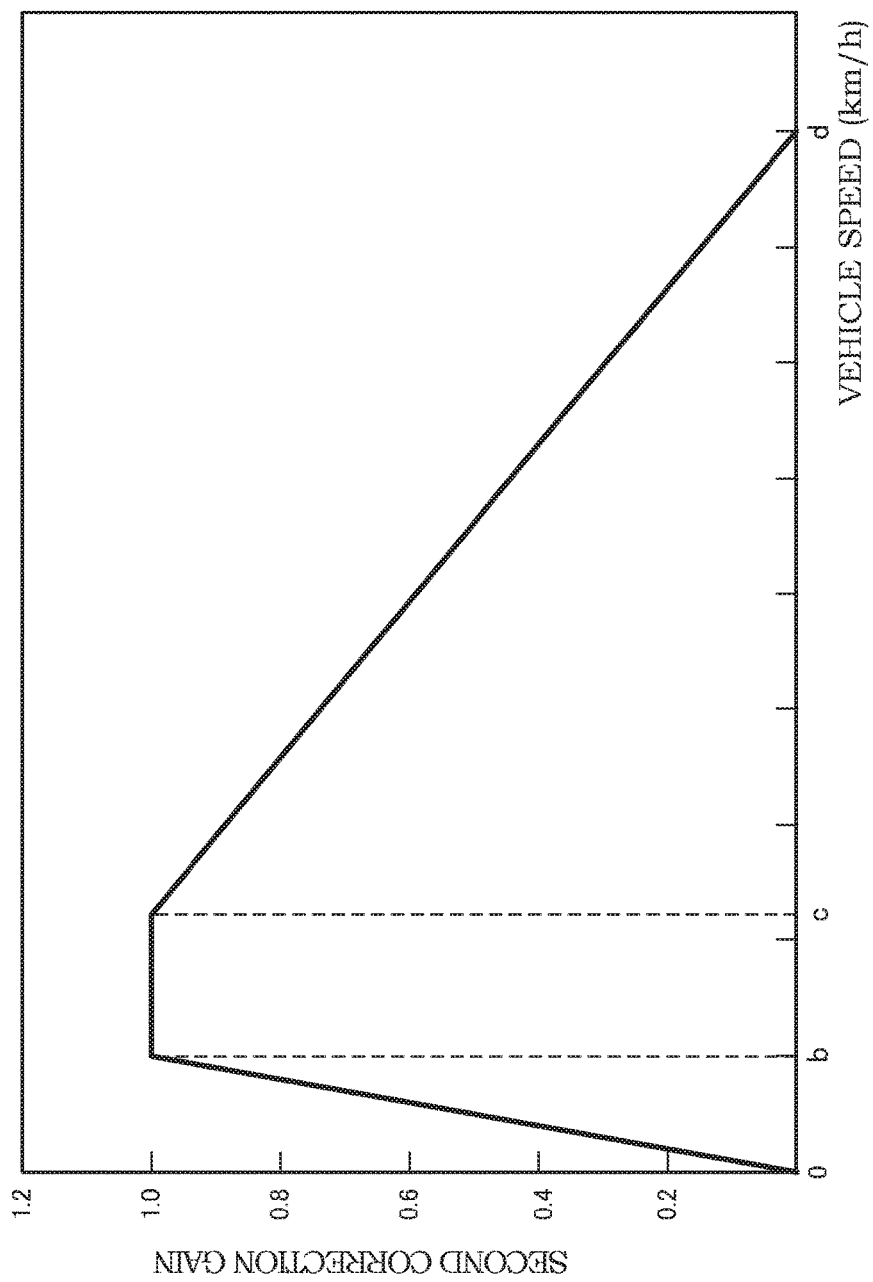
FIG. 7 is a second correction map chart for calculating a second correction gain.

The second correction gain calculation unit 42 calculates the second correction gain for correcting the opposite return current on the basis of the detection result of the vehicle speed sensor 16. Specifically, the second correction gain corresponding to the vehicle speed input from the vehicle speed sensor 16 is calculated by referring to a second correction map shown in FIG. 7. The second correction map is not described since it is identical to the first correction map shown in FIG. 4.

The opposite return current calculated by the opposite return current calculation unit 41 and the second correction gain calculated by the second correction gain calculation unit 42 are output to the adder 46 after being multiplied by the multiplier 43.

The opposite return current is required when a change of the angular acceleration of the electric motor 10 increases due to the action of the self-aligning torque and the return current, and particularly required in the low-speed region. By correcting the opposite return current by the second correction gain, the opposite return current can be caused to act only in the low-speed region and the deterioration of a steering feeling can be prevented by not causing the opposite return current to act in the very low-speed region and the medium/high-speed region.

Embodiments of this invention were described above, but the above embodiments are merely examples of applications of this invention, and the technical scope of this invention is not limited to the specific constitutions of the above embodiments.

This application claims priority based on Japanese Patent Application No. 2014-019418 filed with the Japan Patent Office on Feb. 4, 2014, the entire contents of which are incorporated into this specification.

The invention claimed is:

1. An electric power steering device, comprising:
    an electric motor;
    a torque sensor configured to detect a steering torque input from a steering wheel; and
    a controller configured to
        calculate an assist command value for driving the electric motor to assist a steering of the steering wheel by a driver, on the basis of a detection result of the torque sensor,
        calculate a basic return command value in a direction to return the steering wheel to a neutral position on the basis of a steering angle of the steering wheel,
        calculate a first correction gain for correcting the basic return command value on the basis of a vehicle speed of a vehicle mounted with the electric power steering device,
        calculate a return command value by correcting the basic return command value by the first correction gain,
        calculate an opposite return command value in a direction not to return the steering wheel to the neutral position on the basis of an angular acceleration of the electric motor,
        calculate a correction return command value on the basis of the return command value and the opposite return command value, and drive the electric motor by a control current obtained by adding the correction return command value to the assist command value.

2. The electric power steering device according to claim 1, wherein:
a map specifying a relationship of the angular acceleration of the electric motor and the opposite return command value is stored in the controller, and
the map is set to have such a characteristic that
the opposite return command value is a value in a direction to rotate the steering wheel leftward when the steering wheel rotates rightward, and
the opposite return command value is a value in a direction to rotate the steering wheel rightward when the steering wheel rotates leftward.

3. The electric power steering device according to claim 2, wherein:
the map is set such that an absolute value of the opposite return command value increases as an absolute value of the angular acceleration of the electric motor increases.

4. The electric power steering device according to claim 1, wherein:
the controller is further configured to calculate a second correction gain for correcting the opposite return command value on the basis of the vehicle speed of the vehicle mounted with the electric power steering device.

5. The electric power steering device according to claim 4, wherein:
a map specifying a relationship of the second correction gain and the vehicle speed is stored in the controller, and
the map has such a characteristic that
the second correction gain is at a fixed value of 1.0 in a low-speed region, and
the second correction gain has a smaller value as the vehicle speed increases in a medium/high-speed region.

* * * * *